United States Patent
Niemczyk et al.

(10) Patent No.: US 8,265,819 B2
(45) Date of Patent: Sep. 11, 2012

(54) METHOD AND SYSTEM FOR OPERATOR INTERFACE WITH A DIESEL PARTICULATE FILTER REGENERATION SYSTEM

(75) Inventors: Robert Thomas Niemczyk, Greensboro, NC (US); Jon Michael Quigley, Lexington, NC (US); Michael Dean Blackard, Jamestown, NC (US); Michael Lee McKinley, Kernersville, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 806 days.

(21) Appl. No.: 12/012,680

(22) Filed: Feb. 5, 2008

(65) Prior Publication Data

US 2009/0198402 A1 Aug. 6, 2009

(51) Int. Cl.
- G01M 17/00 (2006.01)
- G06F 7/00 (2006.01)
- G06F 11/30 (2006.01)
- G06F 19/00 (2006.01)
- G07C 5/00 (2006.01)

(52) U.S. Cl. ............ 701/29.1; 701/29.4; 701/32.8; 701/34.4

(58) Field of Classification Search ............ 701/29, 701/29.1, 29.2, 29.4, 32.8, 34.4, 99, 115
See application file for complete search history.

(56) References Cited

U.S. PATENT DOCUMENTS

| | | | |
|---|---|---|---|
| 7,031,827 B2 * | 4/2006 | Trudell et al. | 701/114 |
| 7,043,903 B2 * | 5/2006 | Onodera et al. | 60/295 |
| 7,609,152 B2 * | 10/2009 | Crowe et al. | 340/461 |
| 7,616,129 B2 * | 11/2009 | Thacher | 340/905 |
| 7,631,491 B2 * | 12/2009 | Lange | 60/295 |
| 2004/0204818 A1 * | 10/2004 | Trudell et al. | 701/114 |
| 2007/0068147 A1 * | 3/2007 | Sun et al. | 60/297 |
| 2007/0126698 A1 * | 6/2007 | Iwamoto et al. | 345/156 |
| 2007/0182721 A1 * | 8/2007 | Watanabe et al. | 345/173 |
| 2007/0271906 A1 * | 11/2007 | Berke et al. | 60/285 |
| 2008/0093153 A1 * | 4/2008 | Gudorf | 180/309 |
| 2008/0110238 A1 * | 5/2008 | Kariya et al. | 73/23.31 |
| 2008/0215205 A1 * | 9/2008 | Kariya et al. | 701/29 |
| 2009/0051521 A1 * | 2/2009 | Crowe et al. | 340/461 |

* cited by examiner

*Primary Examiner* — Thomas Tarcza
*Assistant Examiner* — Rami Khatib
(74) *Attorney, Agent, or Firm* — Martin Farrell; Michael Pruden

(57) ABSTRACT

A vehicle operator interface system and method for a diesel particulate filter regeneration system, includes a control unit for receiving information on regeneration status of a vehicle diesel particulate filter and receiving information on operational status of selected vehicle systems and components, a visual display for displaying messages to an operator indicative of said regeneration status and said operational status, an input device for highlighting a portion of the displayed messages and for providing an input selection of a highlighted portion, an input selection being communicated to a control device to carry out the input selection.

12 Claims, 5 Drawing Sheets

METHOD AND SYSTEM FOR OPERATOR INTERFACE WITH A DIESEL PARTICULATE FILTER REGENERATION SYSTEM

FIELD OF THE INVENTION

The invention relates to vehicle on-board systems for regenerating a diesel particulate filter, and more specifically, to systems and methods for an operator interface with such systems allowing operator control of certain functions.

BACKGROUND AND SUMMARY OF THE INVENTION

Diesel Particulate Filters ("DPF" or "DPFs") filter and collect particulate matter ("PM") from the exhaust gases from a diesel engine to prevent the particulate matter from exiting the tailpipe. After a period of operation, the collected particulate matter starts to clog the filter. The filter needs to be replaced or removed for cleaning, which is not practical, or it needs to be cleaned through a process known as regeneration. PM is made up primarily of carbon, and is therefore combustible. Regeneration is a process where temperatures of the exhaust gases are made high enough to combust the DPM within the filter. When engines are operated under higher loads the exhaust gas temperatures are generally high enough to cause at least some amount of regeneration without assistance in a catalyzed DPF. However, during light or short duration cyclic loads, or when ambient temperatures are low, the temperature of the exhaust gas is not high enough to produce regeneration. During these periods it is necessary to actively raise the exhaust gas temperature to facilitate regeneration.

Methods for heating exhaust gas to a temperature sufficient for regenerating an aftertreatment device are known. One method uses a burner mounted on the exhaust conduit upstream of the DPF to deliver combustion gases to the exhaust stream. Another method is to inject a hydrocarbon into the exhaust gas and use a catalytic device that catalytically oxidizes the injected hydrocarbon which elevates the exhaust gas temperature. By whatever method of heating the exhaust gases is used, the heated gases enter the diesel particulate filter and cause much of the accumulated particulate matter to oxidize.

One difficulty in an on-board DPF with a regeneration system is managing the initiation and progress of the regeneration to avoid problems with the elevated exhaust temperatures. In over-the-highway trucks, most regeneration occurs without intervention or assistance because the exhaust temperatures during highway operation are typically at a temperature sufficient for at least some regeneration. If supplemental active regeneration is required, it can be done without problems during highway operation because exhaust is readily dispersed from a truck moving on the highway.

Elevated exhaust temperatures can cause difficulties when the truck is in proximity to people, structures, or vegetation that could be harmed by contact with the heated gases or the heated exhaust pipe. For example, a truck at a fuel pump or loading dock may present a risk to people, spilt fuel, overhanging structure, or the like that may come in contact with the hot exhaust gases or exhaust pipes.

A vocational truck, for example, a trash pick up truck, having start and stop duty cycles will not usually have operating exhaust temperatures sufficient for regeneration and will need to run frequent active regeneration cycles. These trucks often operate around trees, buildings, and other vehicles, which may be adversely affected by hot exhaust gases ejected by the vocational truck.

What is needed is a system that allows the operator of a vehicle having an on-board diesel particulate filter and regeneration system to interact with the regeneration system selectively for initiation and inhibition of a regeneration cycle when conditions warrant.

According to the invention, a vehicle operator interface system for a diesel particulate filter regeneration system, includes a control device for receiving information on regeneration status of a vehicle diesel particulate filter and receiving information on operational status of selected vehicle systems and components, a visual display for displaying messages to an operator indicative of said regeneration status and said operational status, a device for highlighting a portion of the displayed messages and for providing an input selection of a highlighted portion, and means for receiving the input selection and for communicating the input selection to a control device to carry out the input selection.

A method of controlling a vehicle diesel particulate filter regeneration system in accordance with the invention comprises the steps of receiving information regarding a load status of a diesel particulate filter, displaying a message on a display for an operator indicative of said received information, said message requesting an action by the operator, displaying selectable actions on the display responsive to screen selection inputs from the operator, a selectable action being selectable by highlighting said action on the display and activating a selecting device; receiving a selected action input from the operator, and, transmitting said selected action to a control device that will carry out the selected action.

According to another aspect of the invention, the selectable actions include initiating regeneration and inhibiting regeneration.

According to yet another aspect of the invention, displaying a message indicative of the received information includes displaying a message prompting the operator to initiate regeneration.

According to another aspect of the invention, a method further comprises receiving an input from the operator requesting vehicle systems status, and responsive thereto, displaying status information on selected vehicle systems.

According to the invention, the method includes the steps of receiving an input from the operator to initiate regeneration, checking a status of predetermined vehicle system requisites, and one of initiating the regeneration and indicating to the operator that initiating the regeneration failed.

The method in accordance with the invention comprises the steps of receiving an input from the operator to one of inhibit regeneration and permit regeneration, and controlling a regeneration system responsive thereto.

BRIEF DESCRIPTION OF THE DRAWINGS

The invention will be better understood by reference to the detailed description in conjunction with the appended drawings, in which.

DETAILED DESCRIPTION

Figure 1:
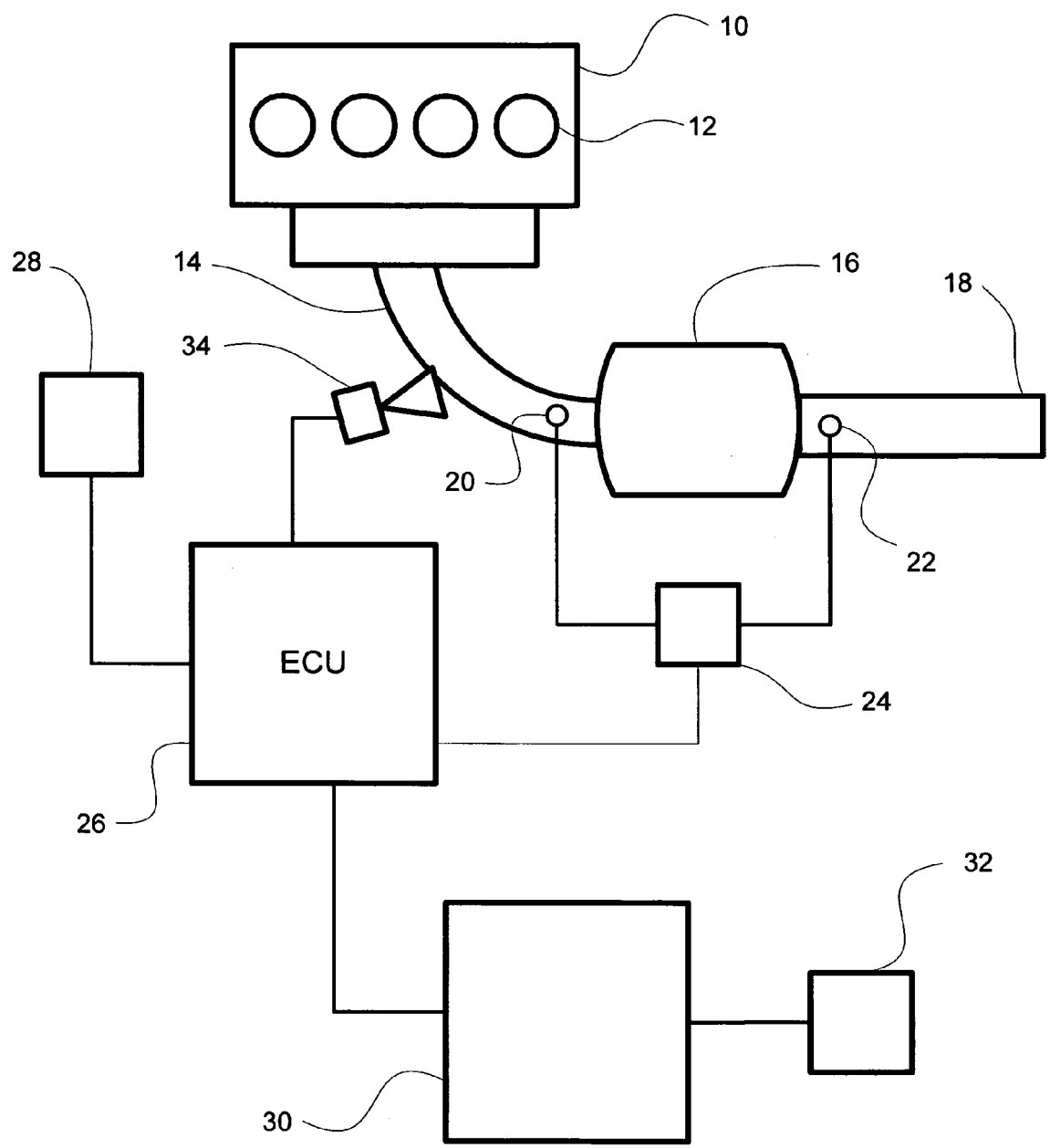
FIG. 1 is a schematic representation of a vehicle diesel particulate filter and regeneration system including an operator interface system in accordance with the invention.

The invention relates to an interfacing system and method for a diesel particulate filter regeneration system in a truck or other vehicle. FIG. 1 is a schematic diagram of how the invention may be integrated in an exemplary simplified diesel engine-equipped vehicle. A diesel engine 10 has an exhaust conduit 14 connected to receive exhaust gas from the engine cylinders 12. The engine 10 in FIG. 1 illustrates six cylinders, however, the details of engine and the number of cylinders is not part of the invention and it is to be understood that the invention may be adapted for an engine of any design.

The exhaust conduit 14 conveys exhaust gas to one or more aftertreatment devices as may be installed on the vehicle. In FIG. 1, a diesel particulate filter (DPF) 16 is illustrated. As is known, a DPF removes particulate matter from the exhaust stream before the exhaust is released to the environment through the stack outlet 18. Pressure sensors are disposed at the inlet 20 and outlet 22 of the DPF to measure the exhaust gas pressure going into and exiting the DPF. The pressure values may be used as an indication of the amount of particulate matter collected in the filter. A processing unit 24 is connected to receive pressure data from the inlet 20 and outlet 22 pressure sensors, and apply an algorithm to determine a particulate load in the DPF. The processing unit 24 communicates the particulate load calculation, or alternatively, the raw pressure data, to a control unit 26, which may be the vehicle's engine control unit (ECU). The control unit 26 will include a control sequence to determine, based on the particulate load calculation, when a regeneration of the DPF is needed to remove collected particulate matter. When initiated by an operator, the control unit 26 will receive and monitor vehicle data 28 to determine whether conditions are appropriate for running a regeneration of the DPF.

The other vehicle data may be related to requisites for the system to allow a regeneration to be done. For example, and for the example described here, the system may be configured for a vocational truck and programmed so that a regeneration may occur only when the truck is parked with various vehicle systems in a neutral or non-active state. These may include one or more of: the parking brake engaged, the service brake not engaged, the clutch pedal not depressed, the transmission in neutral, the accelerator at idle speed, the vehicle speed at zero or below a selected threshold value, no power take-off devices active, the engine oil and/or coolant temperature at a sufficient value, and the exhaust temperature at a sufficient value. The skilled person implementing the system and method in accordance with the invention may of course choose alternative or additional requisites.

The control unit 26 receives the particulate load data from the processing unit 24 and receives information on other vehicle systems from other sensors and devices (not illustrated). Responsive to at least one piece of received information, the control unit 26 causes a message to display on the display unit 30. As described in greater detail below, the message may inform the operator of the particulate load status of the DPF unit, request an action by the operator, or display additional selected information responsive to operator input. An input device 32 is operatively connected to the display to allow the operator to request information and select a particular action to be carried out the control unit 26. The control unit 26 responds to the operator input to cause the selected action to be performed. If a regeneration of the DPF is the selected action, the control unit 26 will cause the vehicle's regeneration sequence to function. In the illustrated embodiment, a regeneration is performed by an injector 34 injecting hydrocarbon into the exhaust upstream of the DPF. If, for example, the DPF includes a catalyzed filter, the hydrocarbon will oxidize when it comes into contact with the catalyst, raising the exhaust gas temperature and burning the collected particulate matter. Other methods of handling an injected hydrocarbon, and other methods of performing a regeneration, as are known or become known could be used in connection with the invention.

Figure 2:
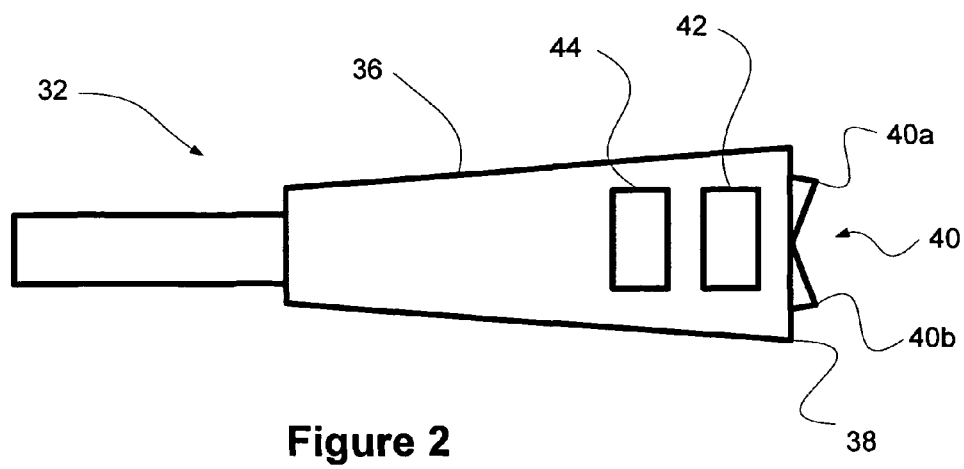
FIG. 2 is a representation of a navigating and selector switch which may be used for operator input in connection with the system of the invention.

The invention may be configured to advantageously operate through existing vehicle devices, that is, the existing instrument panel screen display and existing levers and buttons. FIG. 2 illustrates an input device 32 as may be used with the invention. The input device 32 is integrated in a lever 36 mounted on a vehicle steering column, as, for example, a windshield wiper control lever or turn signal. The input device 32 is positioned for and includes devices conveniently controlled by the fingers, including a rocker switch 40 mounted on the axial end 38 of the lever 36, a first pushbutton switch 42, and a second pushbutton switch 44. These switches are used to scroll through and select various information displays and actions that are displayed on the display unit 30. The rocker switch 40 may be configured so that a movement depressing one side 40a causes a cursor (or highlighting or the like) to move in one direction, for example, advancing through a list or series, and depressing the other side 40b causes the cursor to move in the opposite direction. The first pushbutton switch 42 may be configured to input an "enter" command to cause the selected choice (highlighted or cursor indicated) to be performed. The second pushbutton switch 44 may be configured as an "escape" selection to cause the display to return to the previous display or screen.

Figure 3:
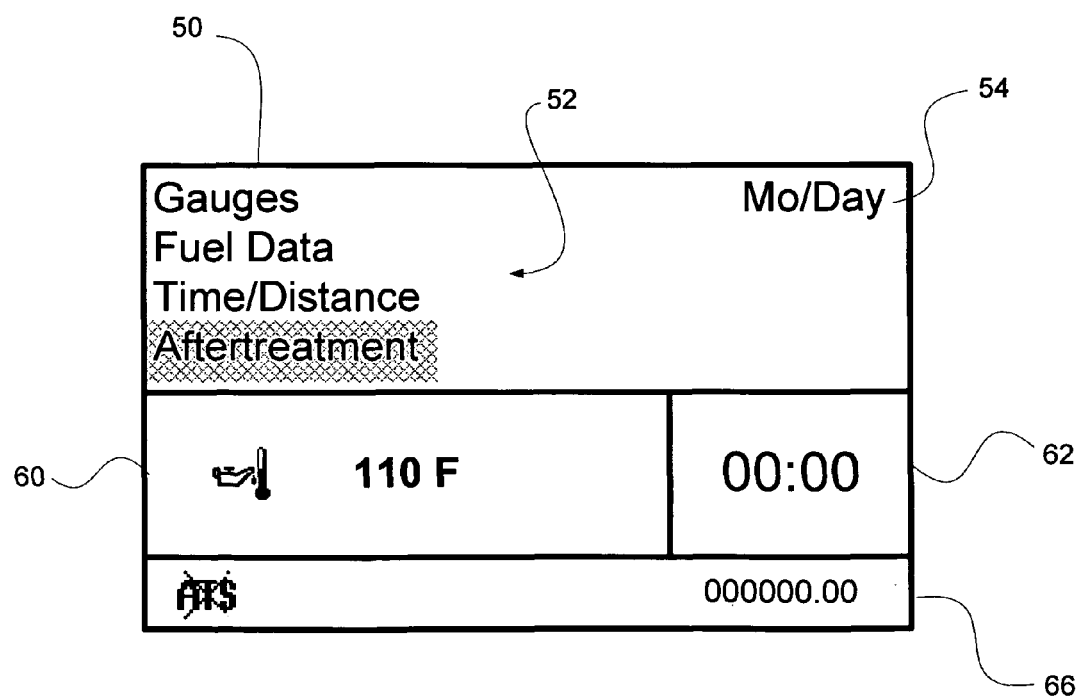
FIG. 3 is a representation of a main or default screen display for an operator for displaying information and receiving operator input.

Turning to FIG. 3, a default or general information screen display is shown. The general display includes a first portion 50 including a series 52 of selections an operator may make to obtain information from the control unit 26 on the status of vehicle components. The illustrated series 50 includes "Gauges", which will display certain vehicle gauges such as speed, engine revolutions, coolant temperature, etc., "Fuel Data" which will show fuel volume and the like, "Time/Distance" which shows trip time and distance traveled, and "Aftertreatment", which shows information and presents action selections related to the aftertreatment system. The first part also includes a day and month display 54.

The default display may include displays of other information, for example, a second portion 60 showing oil temperature, a third portion 62 showing a clock, and a fourth portion 64 including an odometer display 66 and a status indicator 68 for the aftertreatment system. The status indicator 68 is shown as "ATS" crossed out.

Figure 4:
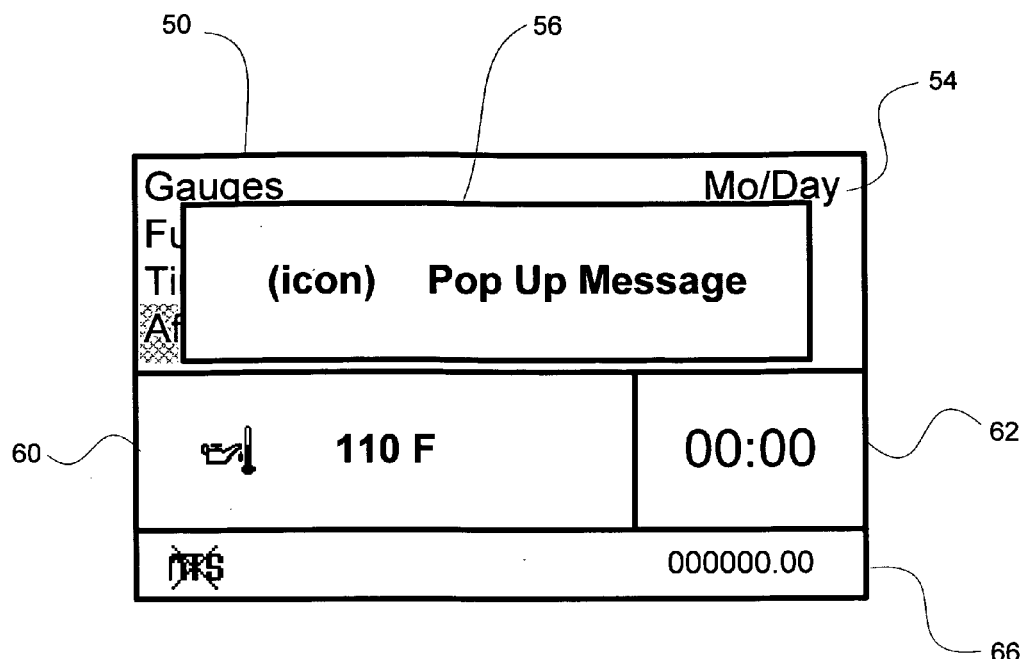
FIG. 4 is a representation of a main screen with a pop-up message box.

According to the invention, and as illustrated in FIG. 4, the control unit 26 will cause a pop-up message box 56 to be displayed to alert the operator of a status change of the DPF system requiring attention, usually that the control unit 26 has determined that regeneration of the DPF is needed. An icon may be included in the message display. The pop-up message may be tailored to the urgency of the need for regeneration.

For example, when the control unit 26 first determines that a regeneration is needed, the message "Parked Regen Needed", may be displayed in the pop-up box 56. As explained below, the operator may then navigate through screen displays to choose more information on vehicle systems or initiate the regeneration as requested. The operator may, however, be forced to ignore the message because it is inconvenient or inappropriate to initiate a regeneration at the time the message is displayed. For example, the vehicle may be at a fuel pump or unloading or picking up a load. The control unit 26 continues to monitor the DPF particulate load, and if a regeneration is not performed when initially indicated, the particulate load will increase, prompting a second, higher urgency, message to be displayed, for example, "Parked Regen Required." This message may be displayed as blinking to underscore the urgency. If the operator does not initiate a regeneration as requested by the message the control unit 26 will continue to monitor the particulate load on the DPF, and when the particulate load reaches a level that could cause engine or exhaust system damage will display a message "ATS Service Required Engine Derate Active", which may also be displayed as blinking or flashing. This indicates to the operator that the aftertreatment service by a technician is required and an operator-initiated regeneration is no longer allowed. In addition, the operator is notified that the engine power is being derated, and the operator should prepare for an engine shutdown, for example, by pulling off the road.

The control unit 26 may determine or estimate the particulate load in the DPF by calculation using the pressure sensor data, by engine running time and load, or any convenient method.

Figure 5:
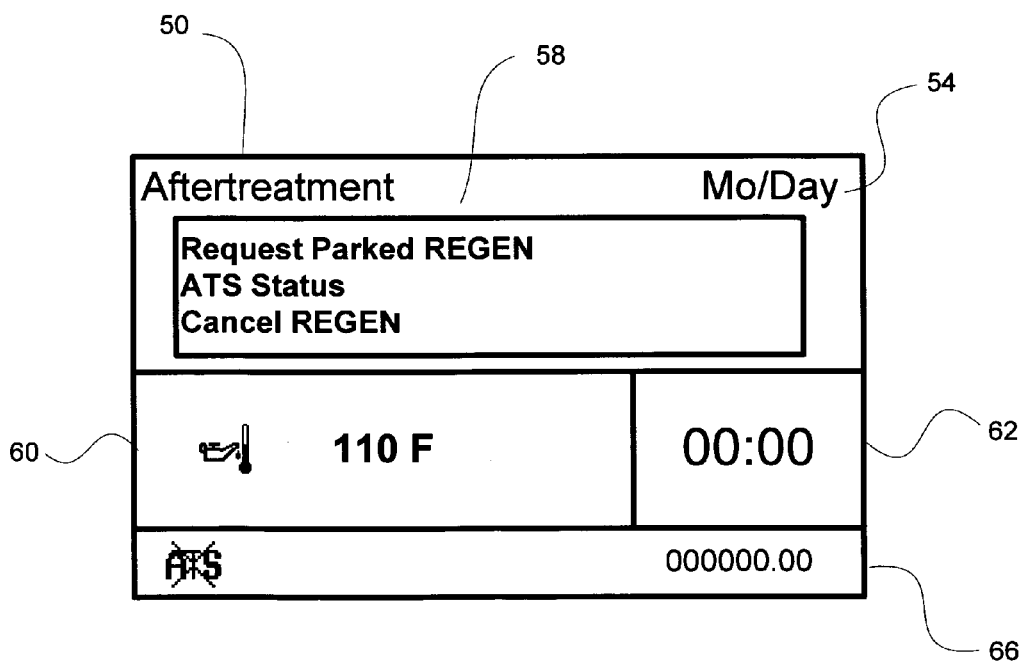
FIG. 5 is a representation of a screen display of options for the aftertreatment system actions of the selections of FIG. 3.

After receiving the message in the pop up box 56 shown in FIG. 4 that a regeneration is needed or required, the operator can remove the pop-up message and return to the default screen by pressing the escape button 44 on the input device 32 shown in FIG. 2. Using the rocker switch 40 the operator may highlight "Aftertreatment" (as shown in FIG. 3), and press the "enter" button 42 to have displayed information and action selections related to the aftertreatment system, which is shown in FIG. 5. The display will indicate that the "Aftertreatment" menu is open, and operator will be presented with a selection box 58 displaying choices of requesting a parked regeneration, checking the ATS (aftertreatment system) status, and canceling or inhibiting regeneration, as will be explained.

As an optional feature of the invention, the operator may select "ATS Status" to inquire on the particulate load specifics, for example, if near the end of a trip to avoid an additional stop. The selection "ATS Status" will display a series shown in FIG. 6, including "DPF Load". The operator may then highlight this selection using the rocker switch 40 and select it using the enter button 42. The system will then display a pop up message box, overlaying the selection box 58, communicating particulate load data, for example, "Soot Level Moderately High", indicating the operator may be able to operate the vehicle for an additional period of time, or, "Soot Level Critically High", indicating that the operator must request a regeneration without undue delay to avoid an engine derate condition.

Figure 7:
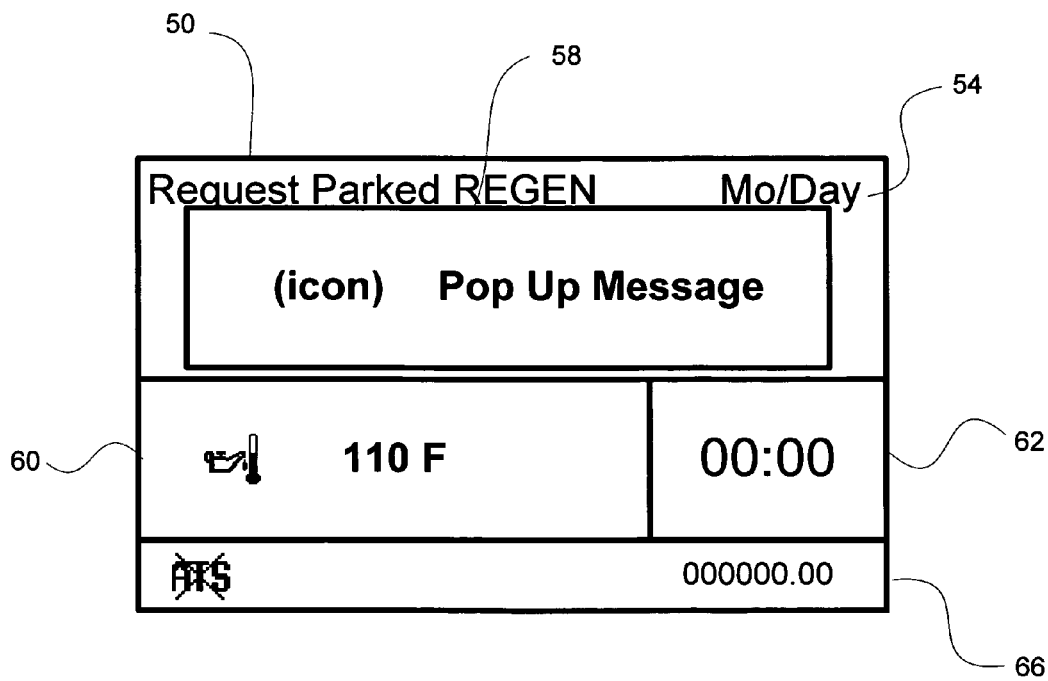
FIG. 7 is a representation of a screen display for the request parked regeneration selection of FIG. 5; and, FIG. 8 is a representative screen display for the cancel regen selection of showing selections for inhibiting or permitting regeneration.

Returning to FIG. 5, the operator may elect to request a regeneration by highlighting and selecting the option "Request Parked REGEN" from the selection box 58. A display screen as shown in FIG. 7 will be shown on the screen showing that "Request Parked REGEN" has been selected and displaying a message box 56. The operator will typically be trained to first park the truck and establish the conditions for a regeneration. The truck may optionally include the instructions in a readily accessible location, for example, on a sun visor card. In response, the system will check whether the requisite conditions are established, and while doing so, display a message indicating "Data Transfer in progress, please wait." An exemplary list of requisite conditions was described in connection with FIG. 1, above.

If the system determines that the vehicle requisite conditions are not appropriate for initiating a regeneration, a message is displayed in the message box 56 indicating "REGEN failed" and instructing the operator to "Check Status Menu", to investigate which of the requisite conditions is not met. Pressing the enter button 42 will bring the operator directly to the screen display shown in FIG. 6, or alternatively, to the screen display shown in FIG. 5 from which the operator can navigate to the display of FIG. 6 by selecting "ATS Status". The screen display of FIG. 6 will include a message box 56 including a listing of vehicle systems: DPF load, Clutch, Service Brake, and PTO Status are shown as examples. Using the rocker switch 42, the operator may scroll through the list to discover which system is not in compliance for regeneration. If the condition is one the operator can correct, such as the parking brake not being engaged or a PTO device being engaged, the operator can make the correction, press escape to return to the screen display of FIG. 5, and re-enter the request for regeneration.

Figure 6:
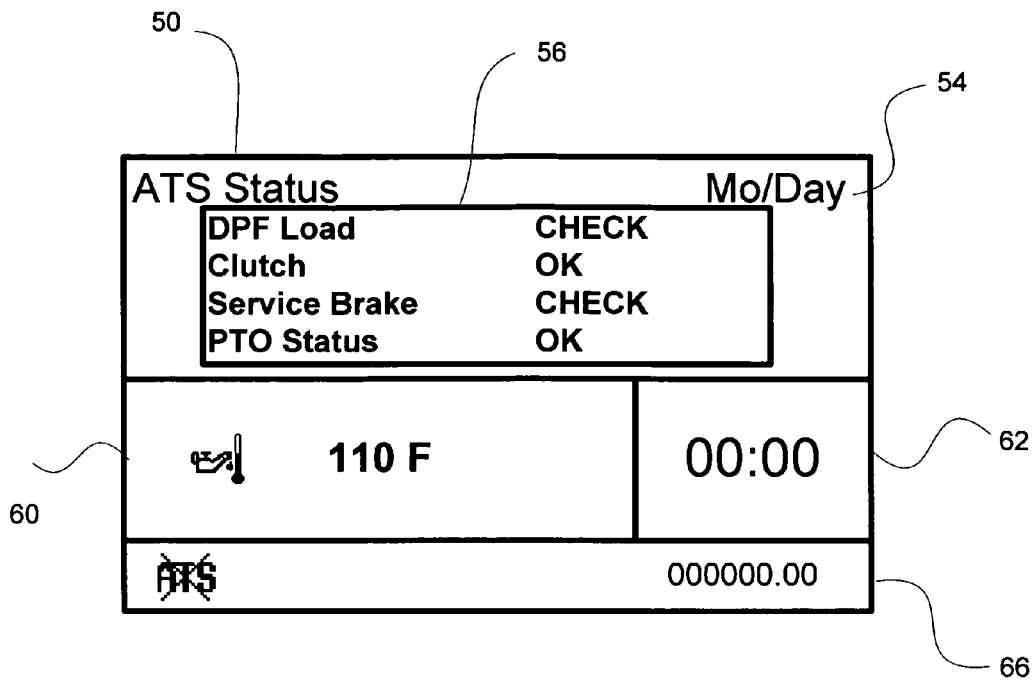
FIG. 6 is a representation of a screen display of options for the aftertreatment system status selection of FIG. 3.

The message that initiation of a regeneration failed may be due to the engine temperature being too low to support the regeneration, which the operator will discover by scrolling through the selections of the screen display shown in FIG. 6. This may happen when the system determines immediately after engine start that a regeneration is needed. In this case, the operator will simply wait for the engine to warm to the appropriate temperature and re-enter the request for regeneration.

Another condition that prevents a regeneration from initiating is that the operator had previously selected to inhibit regeneration under the "Cancel REGEN" selection shown in FIG. 5. By selecting "Cancel REGEN", the display shows the screen display shown in FIG. 8. The operator may highlight either "Disable REGEN" or "Enable REGEN" as needed and press the enter button to make that selection. Of course, to allow regeneration to be initiated, the "Enable REGEN" selection must be selected. As described above, the operator can then return to the display of FIG. 5 using the escape button 44 and re-enter the request for a regeneration.

The "Disable REGEN" selection may be appropriate to prevent inadvertently initiating a regeneration. The "Disable REGEN" selection will also work to cancel an ongoing regeneration, which may be necessary if conditions merit.

Returning to FIG. 7, if a regeneration has been requested, and the requisite vehicle conditions are met, the system will initiate a regeneration of the DPF, which will be indicated by a message "REGEN Requested" as the system prepares for the regeneration. This message will be followed by a pop-up message when the regeneration is actually being performed, "Regen in Progress." The "Regen in Progress" message will continue to be displayed while the regeneration is being done, which may take on the order of twenty minutes to thirty minutes.

Figure 8:
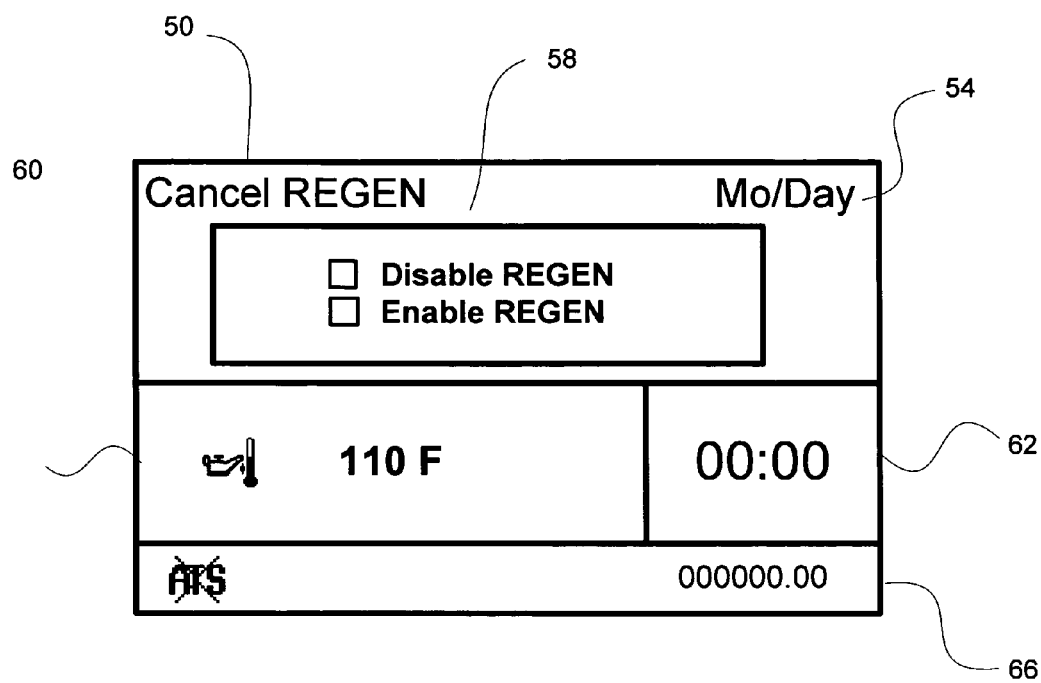

As mentioned, an activated regeneration can be canceled by the operator navigating to the "Cancel REGEN" selection in the Aftertreatment screen of FIG. 5 to the screen display of FIG. 8, and selecting "Disable REGEN". In addition, the system can be configured to cancel an activated regeneration if one or more of the requisite vehicle conditions is changed during the regeneration. For example, if the operator puts the vehicle in gear, releases the parking brake, and presses the accelerator to begin moving the vehicle, three requisite conditions will be changed, and in response to any of them the system may stop the regeneration if configured to do so and display the "Regen failed" message in the pop up box 58.

The invention has been described in terms of exemplary embodiments, structure, and components and those skilled in the art will understand that the scope of the invention is defined by the appended claims and equivalents and substitutions may be made without departing from the scope of the claims.

What is claimed is:

1. A method of controlling a vehicle diesel particulate filter regeneration system, comprising the steps of:
    receiving information regarding a load status of a diesel particulate filter;
    displaying a message on a display for an operator indicative of said received information, said message requesting an action by the operator;
    displaying selectable actions on the display responsive to screen selection inputs from the operator, a selectable action being selectable by highlighting said action on the display and activating a selecting device;
    receiving a selected action input from the operator; and,
    transmitting said selected action to a control device that will carry out the selected action.

2. The method of claim 1, wherein the selectable actions include initiating a regeneration and inhibiting a regeneration.

3. The method of claim 1, wherein displaying a message indicative of the received information includes displaying a message prompting the operator to initiate a regeneration.

4. The method of claim 1, further comprising receiving an input from the operator requesting vehicle systems status, and responsive thereto, displaying status information on selected vehicle systems.

5. The method of claim 1, further comprising receiving an input from the operator to initiate a regeneration, checking a status of predetermined vehicle system requisites, and one of initiating the regeneration and indicating to the operator that initiating the regeneration failed.

6. The method of claim 1, further comprising receiving an input from the operator of one of inhibit regeneration and permit regeneration, and controlling a regeneration system responsive thereto.

7. A vehicle operator interface system for a diesel particulate filter regeneration system, comprising:
    means for receiving information on regeneration status of a vehicle diesel particulate filter and receiving information on operational status of selected vehicle systems and components;
    a visual display for displaying messages to an operator indicative of said regeneration status and said operational status;
    a device for highlighting a portion of the displayed messages and for providing an input selection of a highlighted portion; and,
    means for receiving the input selection and for communicating the input selection to a control device to carry out the input selection.

8. The vehicle operator interface system as claimed in claim 7, wherein the device for highlighting a portion of the displayed messages and for providing an input selection of a highlighted portion comprises a stalk switch positionable on a steering column.

9. The vehicle operator interface system as claimed in claim 7, wherein the visual display is an instrument cluster display.

10. A method of interfacing with a vehicle diesel particulate filter regeneration system, comprising the steps of;
    displaying a message on an interactive instrument cluster display indicative of a load status of a diesel particulate filter, said message prompting an input by an operator using an input device acting through the interactive display to obtain selectable actions relating to the load status;
    displaying selectable actions on the interactive display responsive to the input from the operator, the selectable actions including an action initiating a regeneration and an action inhibiting a regeneration, each selectable action being selectable by highlighting said action on the display and being selected by the operator activating the action using the input device;
    receiving a selected action input from the operator; and,
    transmitting said selected action to a control device that will carry out the selected action.

11. The method of claim 10, further comprising receiving an input from the operator requesting vehicle systems status, and responsive thereto, displaying status information on selected vehicle systems.

12. The method of claim 10, wherein, upon receiving a selected action input from the operator to initiate a regeneration, the method further comprising determining a status of predetermined vehicle system requisites, and, responsive to the determined status, one of initiating the regeneration and indicating to the operator that initiating the regeneration failed.

* * * * *